Sept. 5, 1939.   C. A. BUCHANAN   2,172,121
STEERING WHEEL FOR AUTOMOBILES
Original Filed Nov. 13, 1936   2 Sheets-Sheet 1
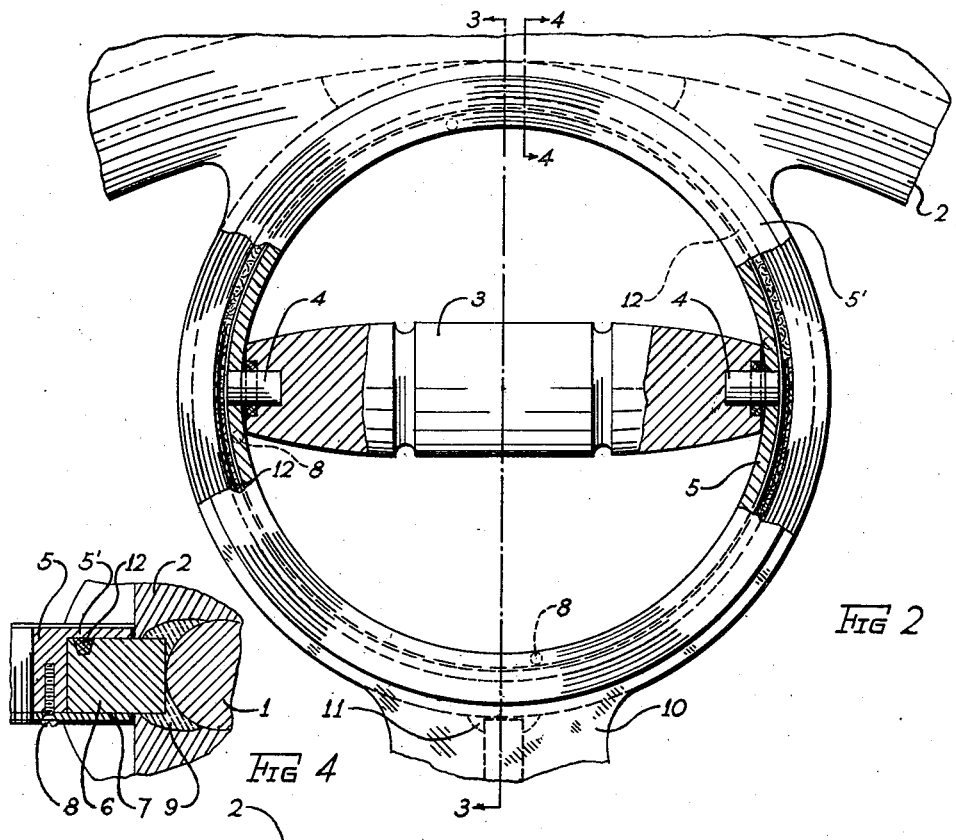
Fig 2
Fig 4
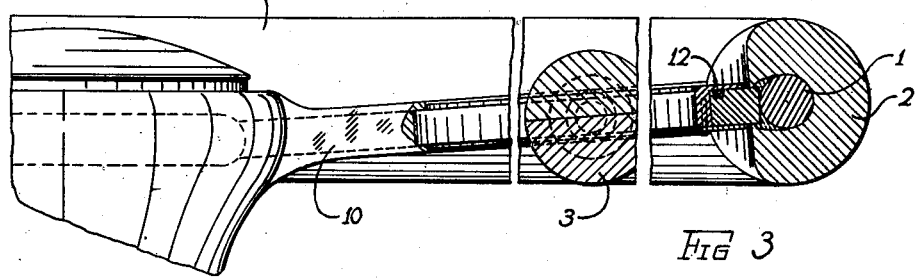
Fig 3
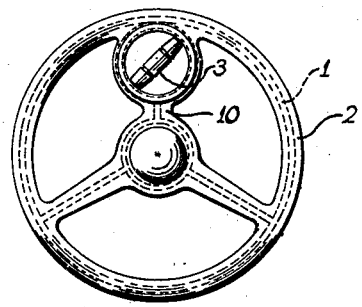
Fig 1
INVENTOR
Charles A. Buchanan
BY Staley + Welch
ATTORNEYS Sept. 5, 1939.   C. A. BUCHANAN   2,172,121
STEERING WHEEL FOR AUTOMOBILES
Original Filed Nov. 13, 1936   2 Sheets-Sheet 2
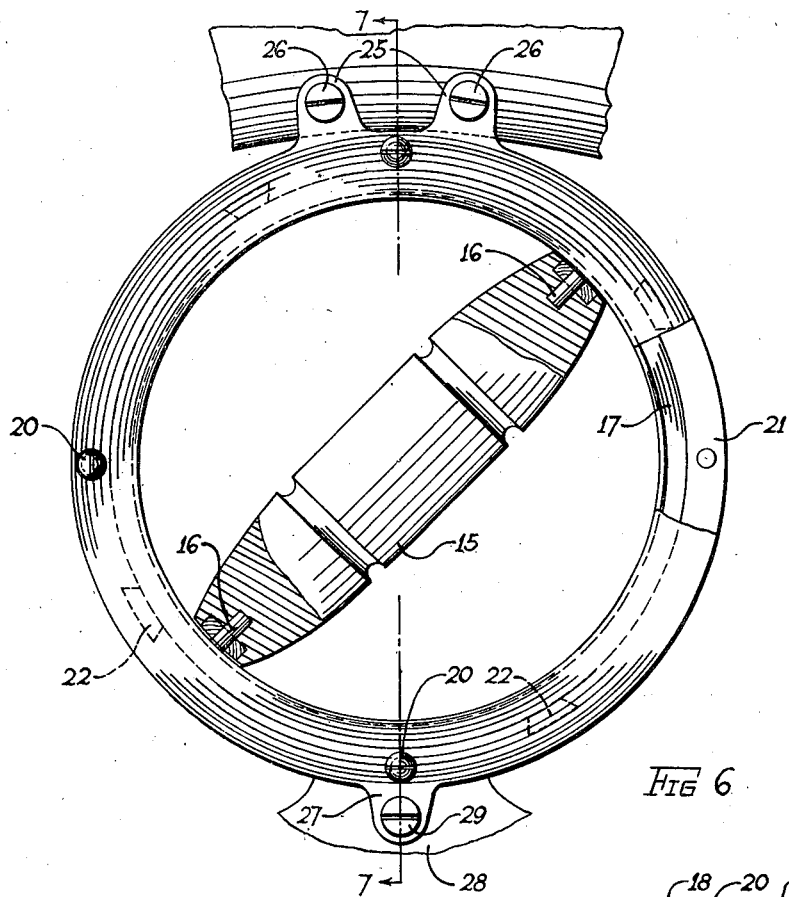
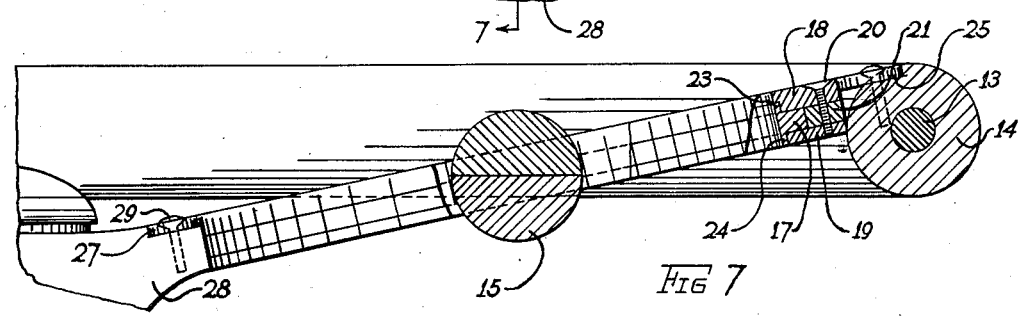
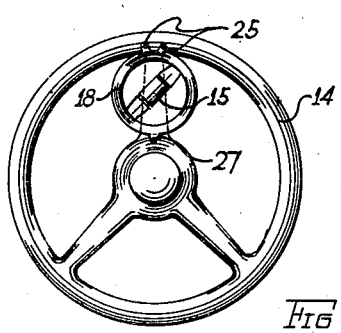

Patented Sept. 5, 1939

2,172,121

UNITED STATES PATENT OFFICE 2,172,121

STEERING WHEEL FOR AUTOMOBILES

Charles A. Buchanan, Columbus, Ohio, assignor of one-half to Frank D. Myers, Worthington, Ohio Application November 13, 1936, Serial No. 110,672
Renewed July 19, 1939

4 Claims. (Cl. 74—557)

This invention relates to a steering wheel for motor vehicles, it more particularly relates to a one-hand gripping device which is applied to the steering wheel either as a permanent installation or as an attachment.

The object of this invention is to provide a device of this character which will be located substantially below the plane circumscribed by the upper surface of the rim of the steering wheel so that there will be no projecting parts above the rim of the wheel which would interfere with the normal steering operation of the driver.

In the accompanying drawings:

Fig. 1 is a plan view on a reduced scale of a steering wheel for an automobile showing my improvement applied thereto as a permanent installation.

Fig. 2 is a substantially full-sized top plan view of a portion of a steering wheel showing my improvement applied thereto as a permanent installation, some of the parts being broken away and shown in section.

Fig. 3 is a section on the line 3—3 of Fig. 2.

Fig. 4 is an enlarged sectional view on the line 4—4 of Fig. 2.

Fig. 5 is a plan view on a reduced scale of a steering wheel of an automobile showing a modified form of my improvement applied thereto as an attachment.

Fig. 6 is a substantially full-size plan view of a portion of the stearing wheel showing my improvement applied thereto as an attachment, some of the parts being broken away and shown in section.

Fig. 7 is a section on the line 7—7 of Fig. 6.

Referring first to Figs. 1 to 4, inclusive, a steering wheel of conventional form is shown, 1 representing an annular metallic reinforcing core and 2 a covering of any suitable material such as Bakelite. In this construction my improved hand-grip is built into the wheel and this is the preferred embodiment of the invention. The hand-grip is indicated at 3, this grip being journalled upon trunnions 4 which are attached in any suitable way to a revoluble grip ring 5. The grip ring 5 has an integral flange 5' which rests upon a stationary bearing ring 6, the grip ring 5 being held in position on the bearing ring 6 by an annular plate 7 which is secured to the grip ring by a plurality of screws 8. The bearing ring 6 is secured to the core 1 of the steering wheel preferably by welding, the welding being indicated at 9, and is secured in the same manner to the hub of the steering wheel, the hub being provided with a short extension 10 to which the bearing ring is welded, the welding being indicated by the dotted lines 11 in Fig. 2. The bearing ring 6 is preferably provided with an annular groove which receives a packing 12 of felt or other suitable material to which a lubricant has been applied at the initial installation, although it is my intention to make the bearing ring 6 and the grip ring 5 of bronze or some other self-lubricating material.

In operation when it is desired to steer with one hand, as in parking, the operator grasps the grip 3 to turn the steering wheel, the grip not only rotating upon its own axis but also circumferentially upon the bearing ring 6.

By this construction it will be noted that the gripping device is located in a plane which is below that circumscribed by the upper surface of the rim of the steering wheel so that there will be no parts which project above the rim of the wheel to interfere with the usual steering operation.

In Figs. 5, 6 and 7 there is shown a modification of my invention and also in these figures the invention is shown as an attachment instead of being built in. In this modified construction 13 represents the metallic reinforcing core of the steering wheel and 14 the covering therefor. The hand grip is indicated at 15, this grip being journalled upon trunnions 16 which are carried by a revoluble ring 17. The ring 17 is interposed between a clamping plate 18 and a bearing ring 19, the plate 18 and ring 19 being secured together by a plurality of screws 20 which pass through an intermediate spacing ring 21. This spacing ring 21 has a plurality of pockets 22 to receive lubricant as shown in dotted lines in Fig. 6. The grip ring 17 has an upper annular flange 23 which fits in a shouldered portion in the plate 18 and also a lower annular flange 24 which embraces the interior of the bearing ring 19.

In order to secure this device to a steering wheel the plate 18 is provided with a pair of ears 25 which are secured to the rim of the steering wheel by screws 26 and also with a third ear 27 which is secured to the hub projection 28 of a steering wheel by a screw 29; this hub projection 28 being the inner part of one of the spokes of the steering wheel which has been cut away to accommodate the gripping device.

Having thus described my invntion, I claim:

1. In a steering wheel for automobiles, a hand grip other than the rim of the steering wheel, devices for revolubly mounting said hand grip between the rim and hub of said wheel, said means revolving upon an axis substantially parallel to the axis of rotation of said steering wheel, and means for mounting said hand grip upon said mounting devices to permit it to revolve upon its own axis.

2. In a steering wheel for automobiles, a revoluble ring carried by said wheel between its rim and hub, a hand grip carried by said ring, and means for mounting said hand grip upon said ring such as to permit said hand grip to revolve upon its own axis.

3. In a steering wheel for automobiles, a revoluble ring carried by said wheel between its rim and hub, a hand grip carried by said ring, and means for mounting said hand grip upon said ring such as to permit said hand grip to revolve upon its own axis, all of said parts being located substantially within the plane circumscribed by the upper surface of the rim of the steering wheel.

4. In a steering wheel for automobiles, a bearing ring connected with the rim and hub of said wheel, a grip ring revolubly mounted upon said bearing ring, a hand grip, and means for connecting said hand grip with said grip ring such as to permit said hand grip to revolve upon its own axis.

CHARLES A. BUCHANAN.